July 16, 1940.  L. D. SOUBIER  2,207,764
METHOD AND APPARATUS FOR MAKING GLASS WOOL
Original Filed April 18, 1934  2 Sheets-Sheet 1

Leonard D. Soubier
INVENTOR.
BY J. F. Rule
ATTORNEY

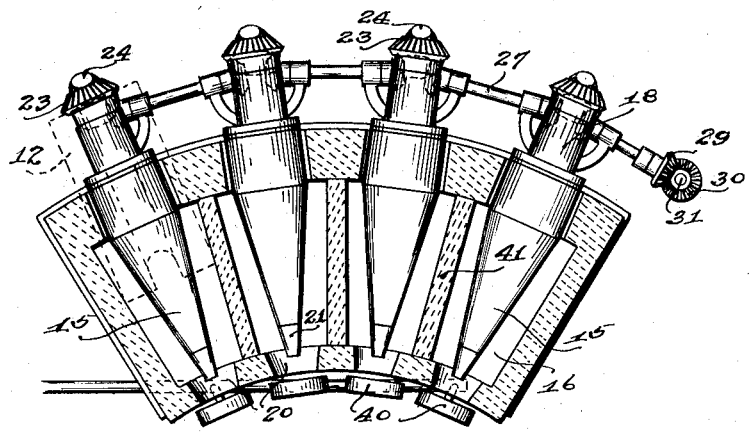
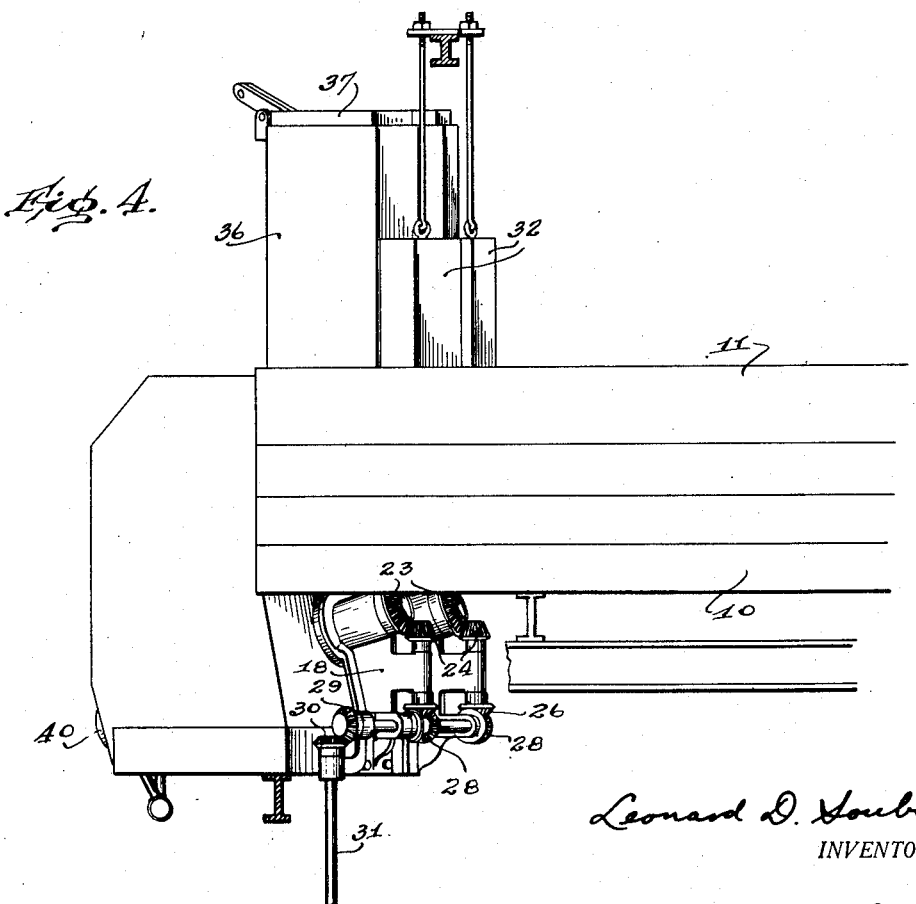

Patented July 16, 1940

2,207,764

UNITED STATES PATENT OFFICE 2,207,764

METHOD AND APPARATUS FOR MAKING GLASS WOOL

Leonard D. Soubier, Toledo, Ohio, assignor, by mesne assignments, to Owens-Corning Fiberglas Corporation, a corporation of Delaware Application April 18, 1934, Serial No. 721,163
Renewed December 22, 1937

6 Claims. (Cl. 49—17)

My invention relates to methods and apparatus for use in the manufacture of glass wool. The invention in its preferred form comprises means for flowing a plurality of streams of molten glass, rotating mandrels individual to the streams on which the glass is wound, blowers by which the glass is drawn from the mandrels and drawn into fine threads or filaments, burners associated with the mandrels and operative to heat the glass and maintain it at the desired high temperature, and means for adjustably regulating and controlling the temperature.

An object of my invention is to provide practical and effective means for adjustably controlling the temperature of the glass flowing over the mandrels.

A further object of the invention is to provide means compactly arranged for delivering a multiplicity of streams of glass, drawing the streams into filaments, and delivering the drawn filaments in a compact form.

A further object is the provision of means for delivering the filaments produced simultaneously from a plurality of streams of glass to a common delivery point.

Other objects of the invention will appear hereinafter.

In the accompanying drawings:

Fig. 3 is a section at the line III—III on Fig. 2.

Fig. 4 is a side elevation of the apparatus.

Figure 1:
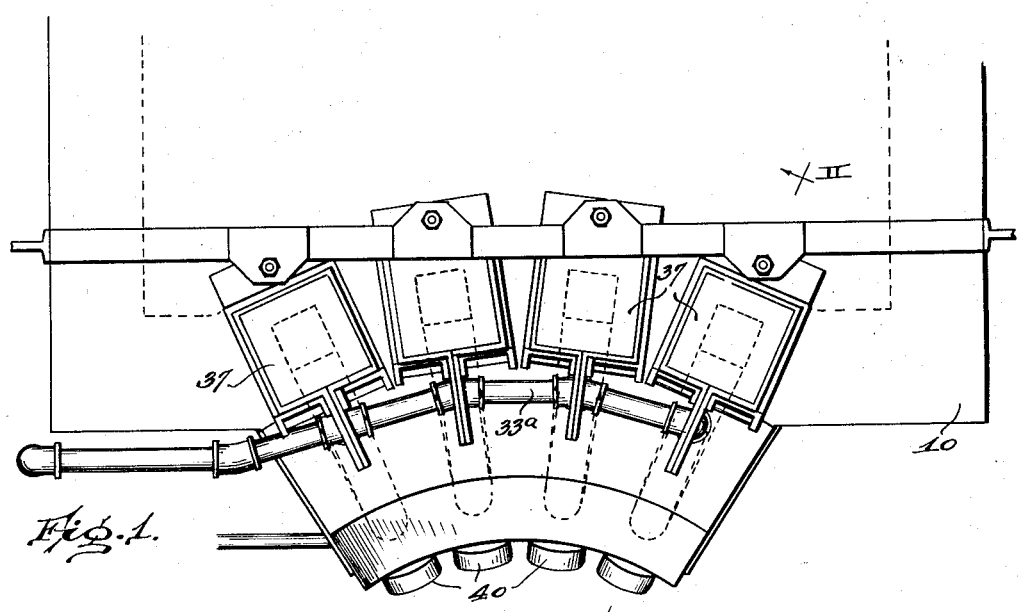
Fig. 1 is a plan view of an apparatus embodying my invention.
Figure 2:
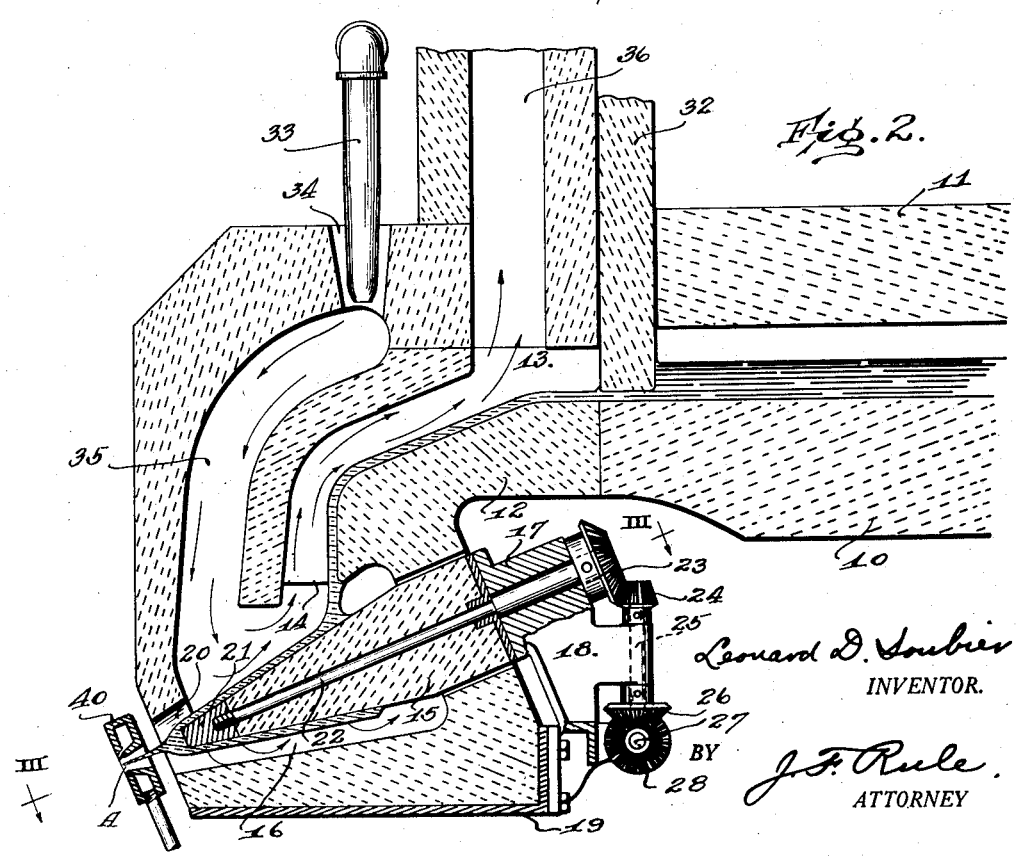
Fig. 2 is a sectional elevation on a larger scale, the section being taken at the line II—II on Fig. 1.

A continuous supply of molten glass is provided by a container 10 which may be a forehearth extension of a melting and refining tank. The container 10 is provided with a roof or cover 11. At the forward end of the container is a flow block 12 formed with channels 13 which are downwardly and forwardly inclined. The channels may be separated by partition walls 14. A battery of mandrels 15 are mounted within a chamber or chambers 16 formed in the lower portion of the flow block 12. The mandrels are mounted to rotate in bearing blocks 17, the latter formed in bearing plates or brackets 18 bolted to a supporting plate 19 which underlies and supports the flow block.

The mandrels are conical or frusto-conical in shape, being downwardly and forwardly tapered with their outer ends projecting into or through openings 20 in the forward ends of the chambers 16. The body portion of each mandrel is made of mulite or other suitable refractory material and the tip 21 of the mandrel is preferably made of a metal which will withstand the high temperature to which it is subjected. The tip 21 may be threaded onto the lower end of a central rod or shaft 22 extending lengthwise through the mandrel, the upper end portion of said shaft being journaled in the bearing block 17. Keyed to the upper end of the rod 22 is a bevel gear 23. A pinion 24 running in mesh with the gear 23 is carried on a vertical shaft 25 mounted in the bracket 18. A gear 26 is keyed on the lower end of the shaft 25. A horizontally disposed drive shaft 27 is made in sections having mounted thereon gears 28 individual to and meshing with the gears 26. A gear 29 on one end section of the shaft 27, runs in mesh with a gear 30 at the upper end of a power driven shaft 31. Continuous rotation of the shaft 31 operates through the described gearing to continuously rotate the mandrels.

The glass flows in thin streams through the channels 13, the rate of flow being adjustably regulated and controlled by damper blocks 32 individual to said channels and individually adjustable up and down. The streams of glass flow downward from the channels 13 onto the rotating mandrels so that the glass is spread out in a film which covers the entire surface of each mandrel below and forward of the point at which the glass flows onto the mandrel. The temperature of the glass flowing over the mandrels is regulated and controlled by burners 33 individual to the mandrels. Fuel gas is supplied to the burners through a manifold 33ª. Each burner projects downward through an opening 34 in the upper wall of the flow block and the burning gases are directed downward from the burners through individual passageways 35 to the heat chambers 16. These burning gases entering a heat chamber 16 impinge directly on the layer or film of glass covering the mandrel, thereby heating the glass to the desired high temperature. A portion or all of the gases may circulate through the heat chamber in a manner to surround and envelop the mandrel. The spent gases are conveyed from the heat chamber 16 upwardly through the channel 13 to a stack 36. These gases passing upward through the channel 13 are in direct contact with the glass flowing through said channels, thereby preventing chilling of the glass. Dampers 37 individual to the stacks 36 are separately adjustable to regulate the draft and thereby adjustably regulate and control the amount of heat supplied to the glass flowing over the mandrels.

Blowers 40 individual to the mandrels are located in front of the openings 20 in position to receive the streams of glass which are drawn off the tips of the mandrel by the force of the air, steam or other gas from the blowers. The blowers 40 may be of conventional construction and operate to continuously reduce the streams of glass to fine threads or filaments. The mandrels are preferably arranged, as shown, in an arc or sector of a circle with their axes converging to a point so that the filaments of glass will all be directed to a common delivery point. It will be understood, however, that the specific arrangement of the mandrels and blowers may be somewhat modified and still obtain this result, particularly as the angle of a blower relative to the mandrel may be varied within rather wide limits because the glass will be drawn through the blower by the force of the blast of gas regardless of the particular angle of the blower. Partition walls 41 are provided between the heat chambers 16, but may be omitted, if desired, thereby providing a heat chamber common to all of the mandrels.

Modifications may be resorted to within the spirit and scope of my invention.

I claim:

1. The combination of means for flowing a stream of molten glass through space, a rotating mandrel in the path of said stream, and blowing means positioned in advance of the mandrel and operative to draw the glass from the mandrel and reduce it to fine threadlike or filamentary form.

2. The combination of a container for molten glass, a battery of mandrels, means for flowing streams of glass from the container onto said mandrels, said mandrels being tapered and convergently arranged, and means for drawing filaments of glass from the tapered ends of the mandrels toward a common point.

3. The combination of a container for molten glass, means providing a plurality of channels arranged side by side through which streams of glass flow from the container, heat chambers beneath said channels into which the streams of glass flow, a battery of mandrels individual to said streams and mounted for rotation in the heat chambers in position to receive the streams of glass, a battery of burners arranged to direct burning gases into said chambers, said channels being arranged to receive the gases from the heat chambers, stacks individual to said channels through which the gases are discharged, and dampers individual to said stacks.

4. The method which comprises flowing a stream of molten glass from a supply body, rotating the flowing glass about an axis and spreading the glass into the form of a hollow conical body, flowing the glass continuously from the tapered or pointed end of the conical body, and drawing it continuously into attenuated threadlike or filamentary form.

5. The method of producing a fine filament, which comprises flowing thermoplastic material from a supply body in a stream through space onto a convergent surface, rotating said surface and thereby spreading the material over said surface, causing the material to flow along the rotating surface and converge to the form of a small stream, and applying pneumatic pressure to said stream in the direction of its flow and thereby attenuating the stream to fine filamentary form while anchored to the said surface.

6. The combination with means for flowing an integral stream of molten glass, of a mandrel positioned to receive and support the flowing stream, means for rotating the mandrel and spreading the glass thereover in film formation, said mandrel shaped to cause a convergent flow of the film of glass thereon, and a blower arranged to draw the converged glass in an integral stream from the mandrel and attenuate it into filamentary form.

LEONARD D. SOUBIER.